(12) United States Patent
Mahmoud (10) Patent No.: US 6,865,669 B1
(45) Date of Patent: Mar. 8, 2005

(54) METHODS FOR OPTIMIZING MEMORY RESOURCES DURING INITIALIZATION ROUTINES OF A COMPUTER SYSTEM

(75) Inventor: Fadi A. Mahmoud, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 688 days.

(21) Appl. No.: 09/910,580

(22) Filed: Jul. 20, 2001

Related U.S. Application Data (60) Provisional application No. 60/233,014, filed on Sep. 15, 2000.

(51) Int. Cl.[7] .............................................. G06F 15/177
(52) U.S. Cl. .................. 713/1; 713/1; 713/2; 713/100; 711/100; 712/220; 712/243; 712/245; 712/248
(58) Field of Search ............................... 713/1, 2, 100; 711/100; 712/220, 243, 245, 248

(56) References Cited

U.S. PATENT DOCUMENTS

| | | | | |
|---|---|---|---|---|
| 4,926,322 A | * | 5/1990 | Stimac et al. | 703/23 |
| 5,305,445 A | * | 4/1994 | Nishikawa | 711/2 |
| 5,349,661 A | * | 9/1994 | Brewer et al. | 713/1 |
| 5,430,845 A | | 7/1995 | Rimmer et al. | |
| 5,455,919 A | * | 10/1995 | Brewer et al. | 719/321 |
| 5,680,556 A | | 10/1997 | Begun et al. | |
| 5,905,888 A | | 5/1999 | Jones et al. | |
| 5,951,684 A | | 9/1999 | Jeon | |
| 5,951,685 A | | 9/1999 | Stancil | |
| 6,263,429 B1 | * | 7/2001 | Siska | 712/245 |

* cited by examiner

Primary Examiner—Lynne H. Browne
Assistant Examiner—Nitin Patel
(74) Attorney, Agent, or Firm—Martine & Penilla, LLP (57) ABSTRACT

Methods for optimizing of memory resources during an initialization routine of a computer system which prepares the computer system for loading of an operating system is disclosed. One exemplary method includes receiving a request from a system BIOS to locate an amount of conventional memory where the amount of conventional memory accommodates at least a decompressed version of data located in an option ROM BIOS. Then the amount of conventional memory requested by the system BIOS is determined. If the amount of conventional memory requested by the system BIOS is not available, the method continues and system BIOS data located within the conventional memory is read where the system BIOS data occupies at least the amount of conventional memory requested by the system BIOS. After the system BIOS data is read, the system BIOS data is written from the conventional memory to an extended memory, and the system BIOS data located in the conventional memory that has been written into the extended memory is deleted.

28 Claims, 10 Drawing Sheets

METHODS FOR OPTIMIZING MEMORY RESOURCES DURING INITIALIZATION ROUTINES OF A COMPUTER SYSTEM

CROSS REFERENCE TO RELATED APPLICATION

This is a non-provisional application claiming priority from a U.S. Provisional Application No. 60/233,014, filed on Sep. 15, 2000.

BACKGROUND OF THE INVENTION

1. Field of the Invention

This invention relates generally to the field of computing technology and more particularly concerns the optimizing of memory resources during the initialization routine of a computer system which prepares the system for the loading of an operating system.

2. Description of the Related Art

During a computer system's initialization routine, commonly referred to as a boot sequence, a variety of diagnostics are performed to ascertain the availability and status of hardware devices and ensure proper operation of components. For example, during initialization, a system BIOS executes a boot program which invokes a series of system checks to ascertain the location, number and identity of various devices connected to the computer system. The processing components may be a variety of host adapter cards including, by way of example only, a video display adapter, a network adapter, a SCSI adapter or other similar device. Further, these host adapters cards may either be non-processor based, such as some SCSI and RAID controllers, or may be processor based, such as some high end or low end RAID controllers.

Figure 1A:
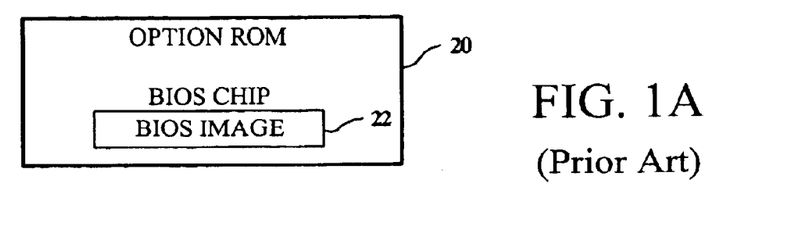
FIG. 1A is a block diagram representing an option ROM BIOS chip for an adapter card having a BIOS image.

In any event, each of these processing components have an associated option ROM BIOS chip 20, as shown in FIG. 1A. The option ROM BIOS chip 20 includes program instructions known as the option ROM BIOS, and is also referred to herein as a BIOS image 22. As the need for more functionality in the initialization process continues to grow, the BIOS image 22 necessarily grows in size. A typical size of a BIOS images 22 utilized in RAID controller applications is about 64K. The contents of the BIOS image 22 includes, among other things, a header, memory allocator code, decompressor code, runtime code, initialization code, and configuration utility code. A typical processor-based RAID controller, such as the AAA-130SA ULLTRA WIDE SCSI RAID Card manufactured by the Adaptec, Inc. of Milpitas, Calif. may have a compressed BIOS image size of approximately 64K.

Figure 1B:
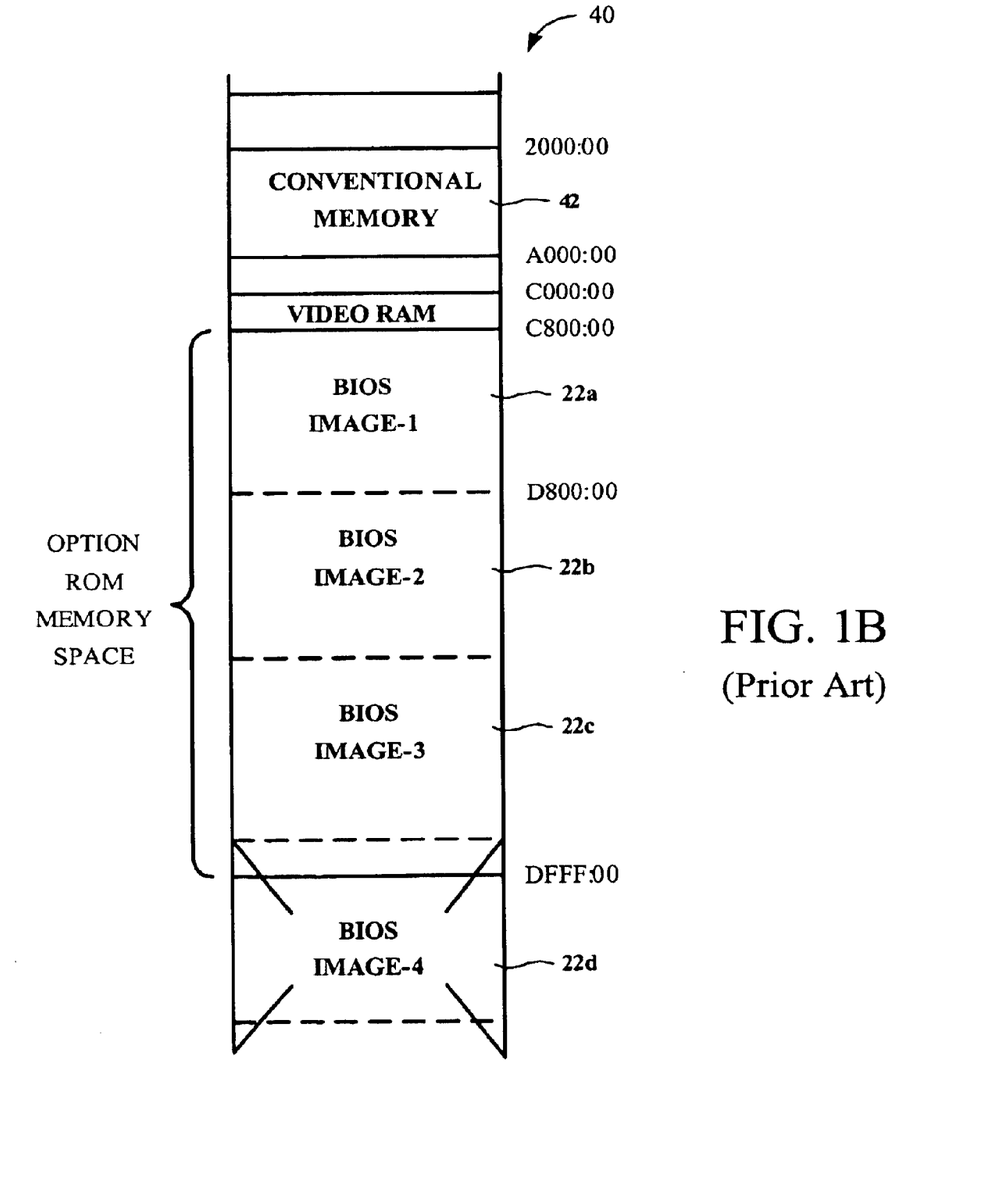
FIG. 1B is block diagram illustrating the memory areas within the system RAM of a computer system.

At boot-up, the system BIOS loads the BIOS image 22 to the system RAM 40. As is well known, the BIOS image 22 is loaded to an area of the system RAM that is dedicated for this use. As shown in FIG. 1B, a hexadecimal address range between C800:00 and DFFF:00 is often referred to as option ROM memory space. For discussion purposes, it should be assumed that BIOS image-1 22a represents the copied 64K BIOS image 22. Once the BIOS image is copied to this memory space, selected portions of the BIOS image are decompressed and copied to conventional memory 42. The decompressed code is then implemented to initialize the host adapter associated with the option ROM BIOS chip 20.

Although no problems arise during the initialization of option ROM BIOS chip 20, there many situations in which a computer system needs to initialize several option ROM BIOS chips. Because the size of the BIOS image continues to grow, the option ROM memory space can be quickly consumed. This problem is pictorially illustrated in FIG. 1B, where four BIOS images 22a, 22b, 22c and 22d need to be copied to the option ROM memory space. In this example, BIOS image-1 22a, BIOS image-2 22b, and BIOS image-3 22c were successfully copied, however, BIOS image-4 22d did not fit within the fixed option ROM memory space. As such, the controller having the BIOS image 22d will not be initialized. Of course, if a controller is not initialized, the devices (e.g., hard disks, CD-ROMs, etc.) connected to the controller will not be available to the .user of the computer system.

Were system BIOS to encounter uncompressed BIOS images, there might also be a problem because these uncompressed BIOS images might occupy a footprint of more than 64K. This would initially occupy even more memory when initially copied from an associated option ROM BIOS chip into the option ROM memory space. This problem of in insufficient memory is further exacerbated by those systems operating in a BIOS boot specification (BBS) environment. In BBS, the system BIOS actually passes through an option ROM twice during a boot sequence, and each time the option ROM has a different size.

In view of the foregoing, what is needed is a new and improved methodology for conserving memory resources available to a computer system during execution of the system BIOS in order to reduce the amount of memory area that is occupied by the system's various BIOS images. Such an approach would thereby ensure proper initialization of the computer system.

In addition, there is a need for a new methodology for accessing and allocating conventional memory for use by the system BIOS so more memory resources are available to the computer system during initialization and reconfiguration.

SUMMARY OF THE INVENTION

Broadly speaking, the present invention fills these needs by providing computer implemented methods for optimizing memory resources available to a computer system during execution of the system BIOS. It should be appreciated that the present invention can be implemented in numerous ways, including as a process, an apparatus, a system, computer readable media, or a device. Several inventive embodiments of the present invention are described below.

In one embodiment, a method for optimizing of memory resources during an initialization routine of a computer system which prepares the computer system for loading of an operating system is provided. In this embodiment, the method includes receiving a request from a system BIOS to locate an amount of conventional memory where the amount of conventional memory accommodates at least a decompressed version of data located in an option ROM BIOS. Then the amount of conventional memory requested by the system BIOS is determined. If the amount of conventional memory requested by the system BIOS is not available, the method continues and system BIOS data located within the conventional memory is read where the system BIOS data occupies at least the amount of conventional memory requested by the system BIOS. After the system BIOS data is read, the system BIOS data is written from the conventional memory to an extended memory, and the system BIOS data located in the conventional memory that has been written into the extended memory is deleted.

In another embodiment, a computer readable media having program instructions for optimizing of memory resources during an initialization routine of a computer system which prepares the computer system for loading of an operating system is provided. In this embodiment, a request from a system BIOS is received which locates an amount of conventional memory where the amount of conventional memory accommodates at least a decompressed version of data located in an option ROM BIOS. Then the availability of the amount of conventional memory requested by the system BIOS is determined. If it is determined that the amount of conventional memory requested is not available, the system BIOS data located within the conventional memory is read where the system BIOS data occupies at least the amount of conventional memory requested by the system BIOS. The system BIOS data is then written from the conventional memory to an extended memory. Finally, the system BIOS data located in the conventional memory that has been written into the extended memory is deleted.

In yet another embodiment, a computer implemented method for optimizing of memory resources during an initialization routine of a computer system which prepares the computer system for loading of an operating system is disclosed. In this embodiment, a request from a system BIOS to locate an amount of conventional memory is executed where the amount of conventional memory accommodates at least a decompressed version of data located in an option ROM BIOS. Then, availability of the amount of conventional memory requested by the system BIOS is determined. If it is determined that the amount of conventional memory requested is not available, a system BIOS data located within the conventional memory is migrated to an extended memory. The system BIOS data remaining in the conventional memory is then deleted. Finally, a migrated system BIOS data in the extended memory is returned to the conventional memory after an initialization code has been executed to initialize a processing component.

In still another embodiment, a method for optimizing memory resources during an initialization routine of a computer system is disclosed. In this embodiment, a request to locate an amount of conventional memory is executed where the amount of conventional memory accommodates at least a decompressed version of BIOS data. Then, availability for the requested amount of conventional memory is determined. If it is determined that the amount of conventional memory requested is not available, a system BIOS data located within the conventional memory is migrated to an extended memory. The migrated system BIOS data from the conventional memory is then deleted. Finally, the migrated system BIOS data is returned from the extended memory to the conventional memory after the BIOS data has been initialized in the conventional memory.

The advantages of the present invention are numerous. Most notably, by creating methods whereby conventional memory may be intelligently and powerfully managed and allocated for use by the system BIOS, more memory resources may be made available to the computer system during initialization and reconfiguration which did not exist previously. The methods described herein may be used to actively allocate additional conventional memory space by migrating data from conventional memory to extended memory temporarily thus freeing up memory space for use by the system BIOS for initialization and reconfiguration processes. The migrated data may then be moved back to the original location within the conventional memory after the system BIOS has completed the initialization or reconfiguration. Therefore, the capabilities of the conventional memory are expanded by the strategic migration and return of system BIOS data to and from extended memory.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for a method of optimizing memory resources during the initialization routine of a computer system which prepares the system for the loading of an operating system. It will be obvious, however, to one skilled in the art, that the present invention may be practiced without some or all of these specific details. In other instances, well known process operations have not been described in detail in order not to unnecessarily obscure the present invention.

The memory conservation methodology of the present invention is adapted for use with a computer system during execution of the system BIOS. For purposes of this disclosure, the computer system includes at least one processing component having an associated BIOS image. In one preferred embodiment, this processing component is an adapter card having an associated option ROM BIOS chip including a BIOS image that is either compressed or uncompressed. In still other embodiments, the processing component can be in the form of a controller chip (e.g., a RAID controller, a SCSI controller, etc.), which may be integrated into a motherboard of a computer system as opposed to on an adapter card. In such a case, the controller chip is also generally associated with a BIOS image (i.e., in the form of an option ROM chip). In either case, the associated BIOS image is characterized at least in part by a header, such as a PCI device ID, a runtime code and an initialization code. The computer system also includes a system RAM having an option ROM memory space of a confined size for accommodating at least a portion of this BIOS image.

As discussed above in the background section, the inability under certain circumstances for each of a computer system's various BIOS images to be loaded into the option ROM memory space of system RAM during a boot sequence renders the computer system unable to properly initialize each of its various controllers. It is therefore an embodiment of the present invention to reduce the amount of memory within this option ROM memory space that is occupied by a BIOS image during execution of a boot sequence, thereby to allow for complete initialization of the controllers associated with the computer system.

Figure 2A:
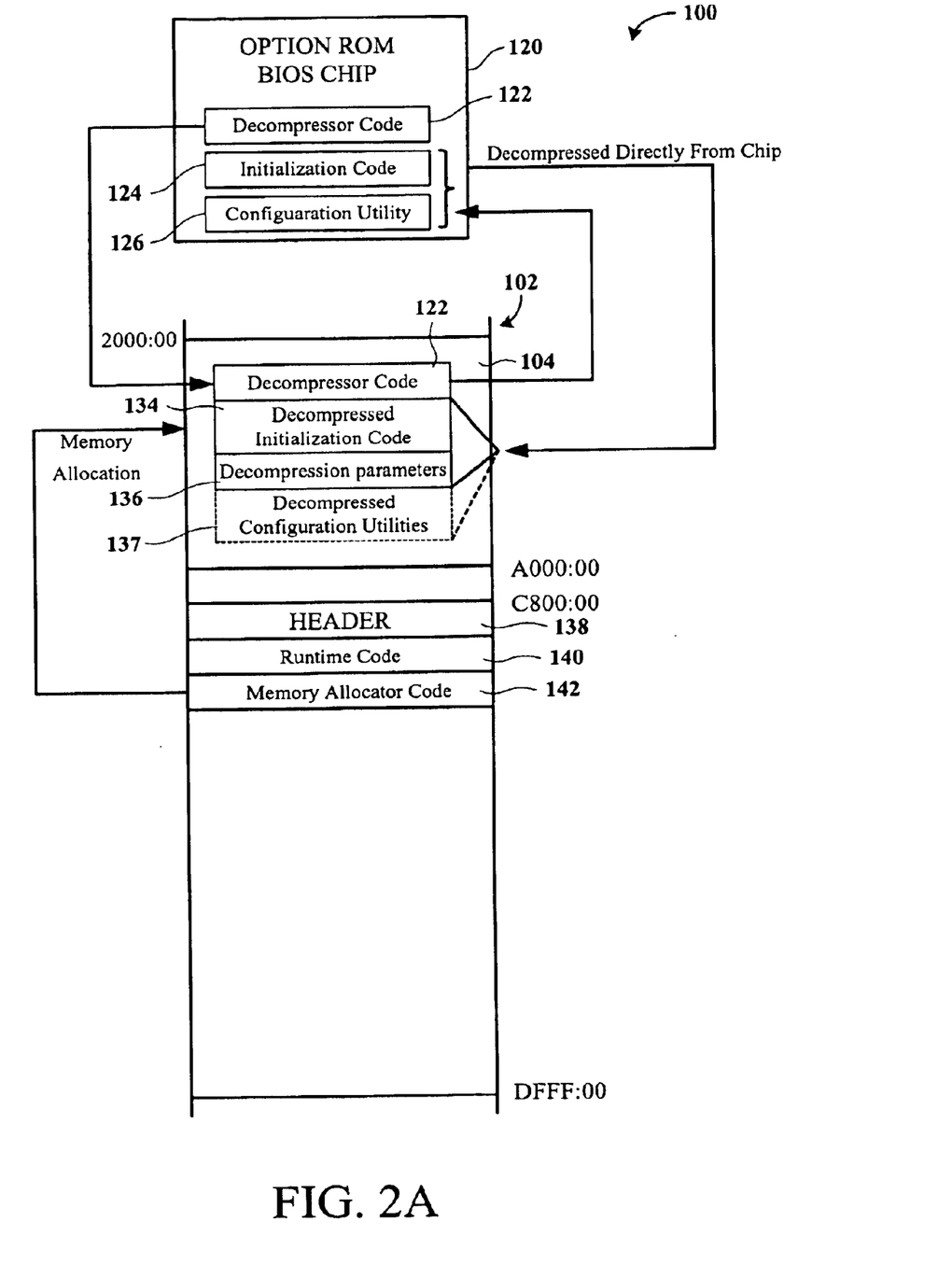
FIG. 2A illustrates a diagram that includes an option ROM BIOS chip and system RAM, in accordance with one embodiment of the present invention.

FIG. 2A illustrates a diagram 100 that includes an option ROM BIOS chip 120 and system RAM 102, in accordance with one embodiment of the present invention. At initialization, only a portion of the option ROM image associated with the option ROM BIOS chip 120 is loaded into the option ROM memory space defined between C800:00 and DFFF:00. In this embodiment, only a header 138, runtime code 140, and memory allocator code 142 are loaded from the option ROM BIOS chip 120 to the option ROM memory space. Thus, the header 138, runtime code 140 and memory allocator code 140 occupy about 16K of memory space. It should be noted that 16K is substantially less than if the entire image of 64K had been loaded. Of course, 16K is only an example, and the benefits of the invention will still apply so long as the loaded portion is less than the entire BIOS image. Once loaded, the memory allocator code 142 will allocate memory space in conventional memory 104 for decompressing certain components directly from the option ROM BIOS chip 120. For example, the allocated memory space may include 64K for initialization code, 16K for decompression parameters, and 4K for decompressor code. The allocated memory may also include additional space to support other decompression items.

Now that memory space has been allocated in conventional memory 104, the decompressor code 122 is copied to the conventional memory in the allocated space. In this embodiment, it should be noted that the decompressor code 122 is not loaded to the option ROM memory space. In this example, the header, the runtime code, and the memory allocator only occupy about 16K of option ROM memory space. This is in contrast to prior art implementations which need to copy the entire contents of the BIOS image into the option ROM memory space. In some RAID applications, the BIOS image can be as large as 64K, however, in accordance with an embodiment of the present invention, the same RAID application may only need to copy a portion of the BIOS image (e.g., 16K of the BIOS image).

The decompression code 122 is now executed to enable the decompression of initialization 124 into decompressed initialization code 134 directly from the option ROM BIOS chip 120. It is important to note that the decompression directly from the option ROM BIOS chip 120 allows only part of the option ROM code to be loaded into the option ROM memory space, thus reducing the footprint of the BIOS image. The decompression code 122 will also produce certain decompression parameters 136, which are also stored in the conventional memory 104. The decompressed initialization code 134 is then executed to enable the initialization of the controller associated with the option ROM BIOS chip 120.

In another features of this embodiment, if the user wants to implement a configuration utility, an interrupt can be initiated. For example, the user can cause an interrupt by pressing the keys <control><A>. This interrupt will cause the memory allocator 142 to allocate additional memory in the conventional memory 104 for storing decompressed configuration utilities 137. The decompressed configuration utilities may include, for example, SCSI configuration, container configuration structures, container configuration, and the like. Now that the memory space is allocated in the conventional memory 104, the decompression code 144 will refer to the option ROM BIOS chip 120 and initiate direct decompression to the allocated conventional memory, thus storing decompressed configuration utilities 137. The decompressed configuration utilities 137 can then be executed to enable the user to perform desired configurations.

Figure 2B:
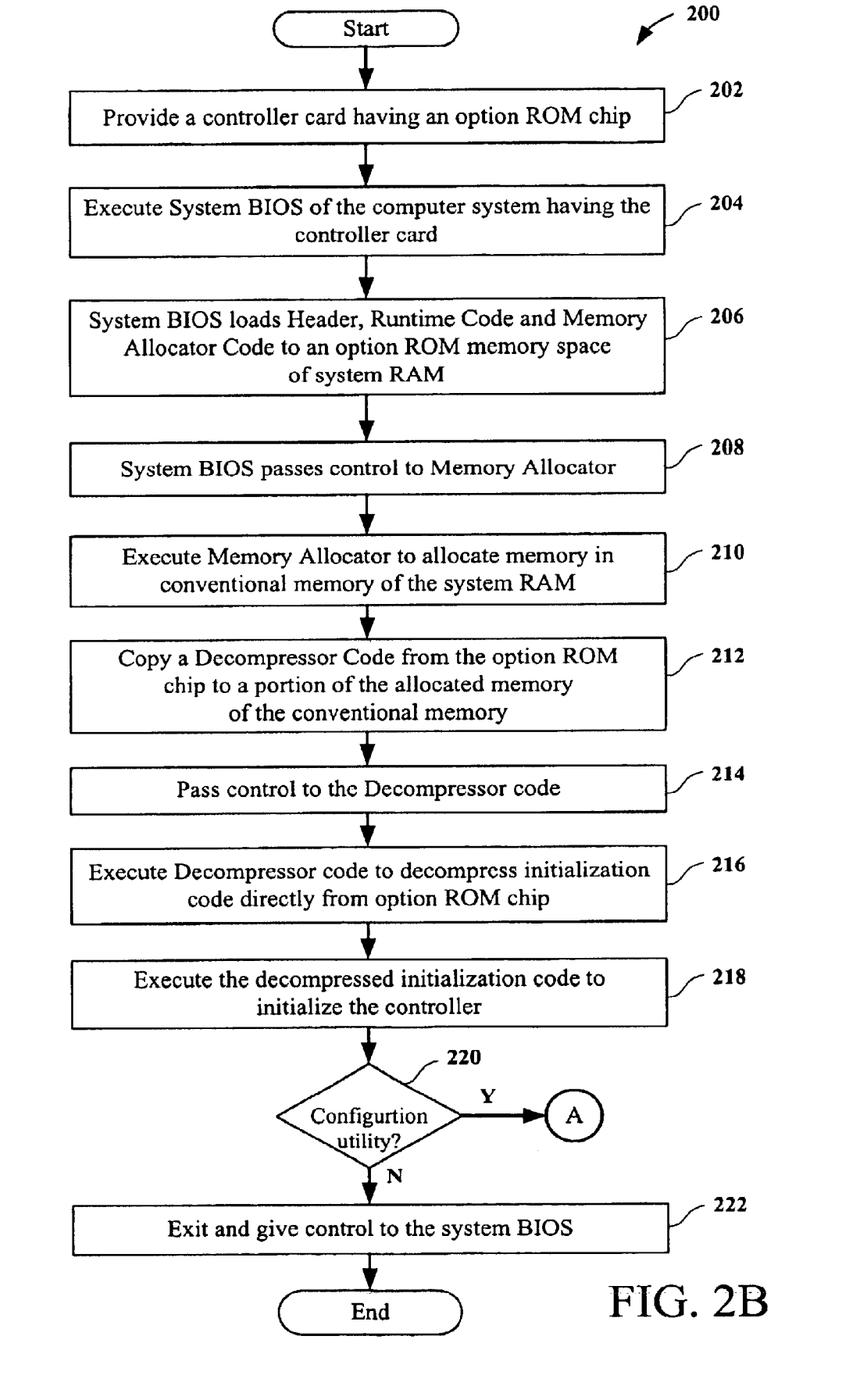
FIG. 2B illustrates a flowchart that defines the method operations implemented to initialize a controller, in accordance with one embodiment of the present invention.

FIG. 2B illustrates a flowchart 200 that defines the method operations implemented to initialize a controller, in accordance with one embodiment of the present invention. The method begins at an operation 202 where a controller card having an option ROM chip is provided. The method then advances to operation 204 where the system BIOS of the computer system having the controller card is executed. The system BIOS then loads in operation 206 a header, a runtime code, and a memory allocator from the option ROM chip to the option ROM memory space of the system RAM. The loaded parts thus represent a portion of the BIOS image.

The system BIOS then passes control to the memory allocator code in operation 208 and the memory allocator code is executed in operation 210. The allocator code is configured to allocate memory in conventional memory of the system RAM. The allocated memory space should be large enough to hold a decompressor code, decompressed initialization code, and decompression parameters. In one example, the decompressor code may be about 4K, the decompressed initialization code may be about 64K, and the decompression parameters may be about 16K.

In operation 212, decompressor code is copied from the option ROM chip to a portion of the allocated memory of the conventional memory. Once the decompressor code is copied to the conventional memory, control is passed to the decompressor code in operation 214. The decompressor code is then executed in operation 216 to enable decompression of the initialization code directly from the option ROM chip. By "directly," it is meant that the compressed initialization code does not have to be loaded to the option ROM memory space of the system RAM, but can remain on the option ROM chip. When decompression of the compressed initialization code is desired, only the uncompressed initialization code needs to be loaded to the system RAM. However, when loaded, the uncompressed initialization code is only loaded to the conventional memory and not to the option ROM memory space.

The uncompressed initialization code is then executed in operation 218 to enable initialization of the controller. For instance, if the controller has certain hard drive devices and other devices connected thereto, the computer system will be able see and access those devices. At this point, the method moves to a decision operation 220 where it is determined if the user wants to access a configuration utility.

For example, if the user presses <control> <A>, the process will be interrupted. The configuration utility process is described in greater detail with reference to FIG. 4.

Figure 3A:
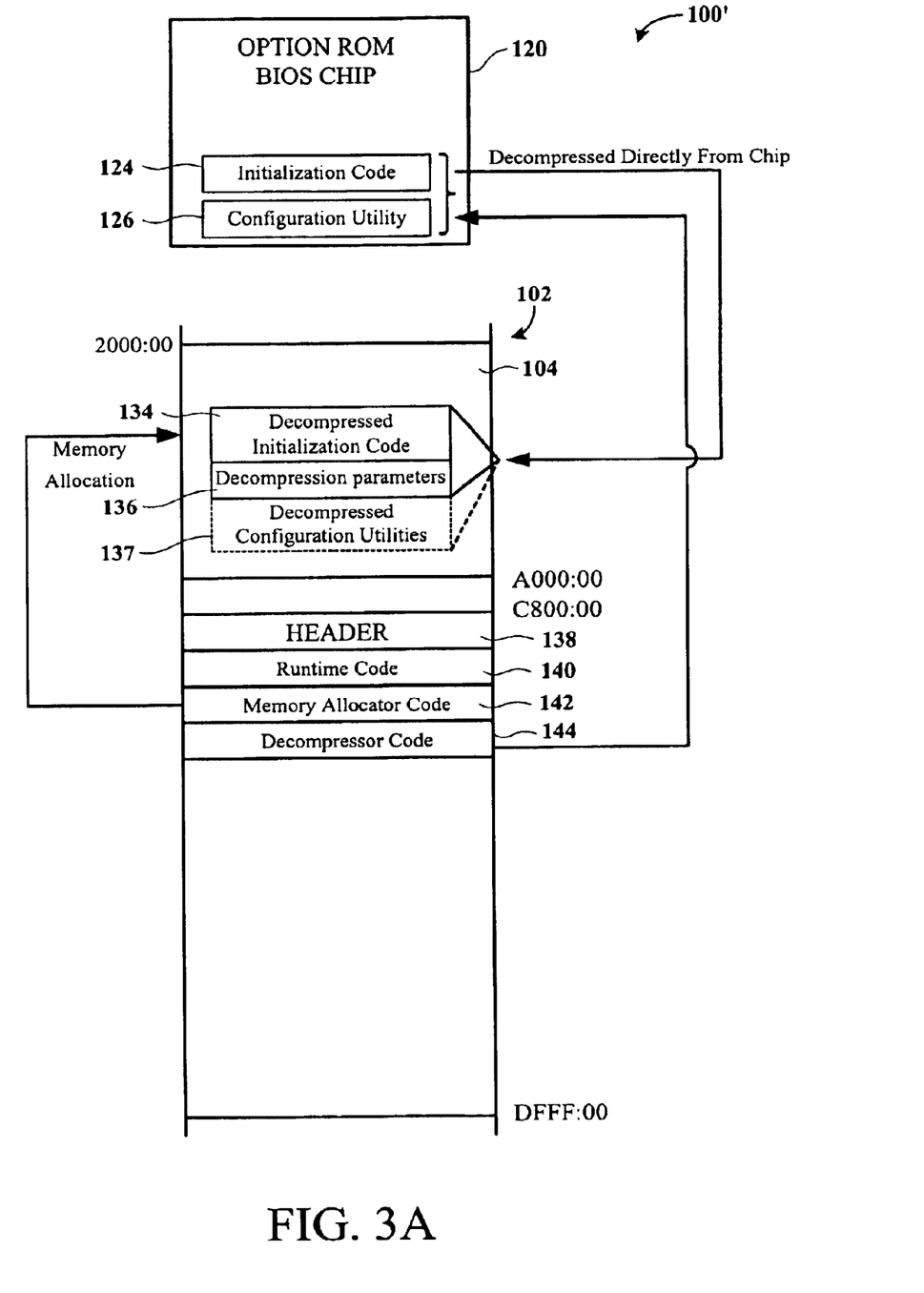
FIG. 3A illustrates a diagram that includes an option ROM BIOS chip and system RAM, in accordance with another embodiment of the present invention.

FIG. 3A illustrates a diagram 100' that includes an option ROM BIOS chip 120 and system RAM 102, in accordance with another embodiment of the present invention. In this it embodiment, the decompressor code 144 is initially copied to the option ROM memory space between C800:00 and DFFF:00. This is in contrast to the embodiment described with reference to FIGS. 2A and 2B, which does not copy the decompressor code 144 to the option ROM memory space. Preferably, the decompressor code 144 will only occupy 4K of additional memory space, and therefore, should not significantly impact the usage of option ROM memory space. In opereation, the memory allocator code 142 is then configured to allocate enough memory space in the conventional memory 104 to receive the decompressed initialization code and decompression parameters 136. Once allocated, the decompressor code 144 will communicate with the option ROM BIOS chip 120 to enable decompression of the initialization code 124 directly to the allocated memory in the conventional memory 104. Control can then be passed to the decompressed initialization code 134 in order to perform the initialization of the controller. As described above, the controller can be a SCSI controller, a RAD controller, or the like.

If desired, the user can also implement the configuration utility 126. It should be noted that the configuration utility 126 will remain on the option ROM BIOS chip until the user causes an interrupt. Of course, the user may wish not to implement the configuration utility 126, and therefore, will not be decompressed into the conventional memory 104.

Figure 3B:
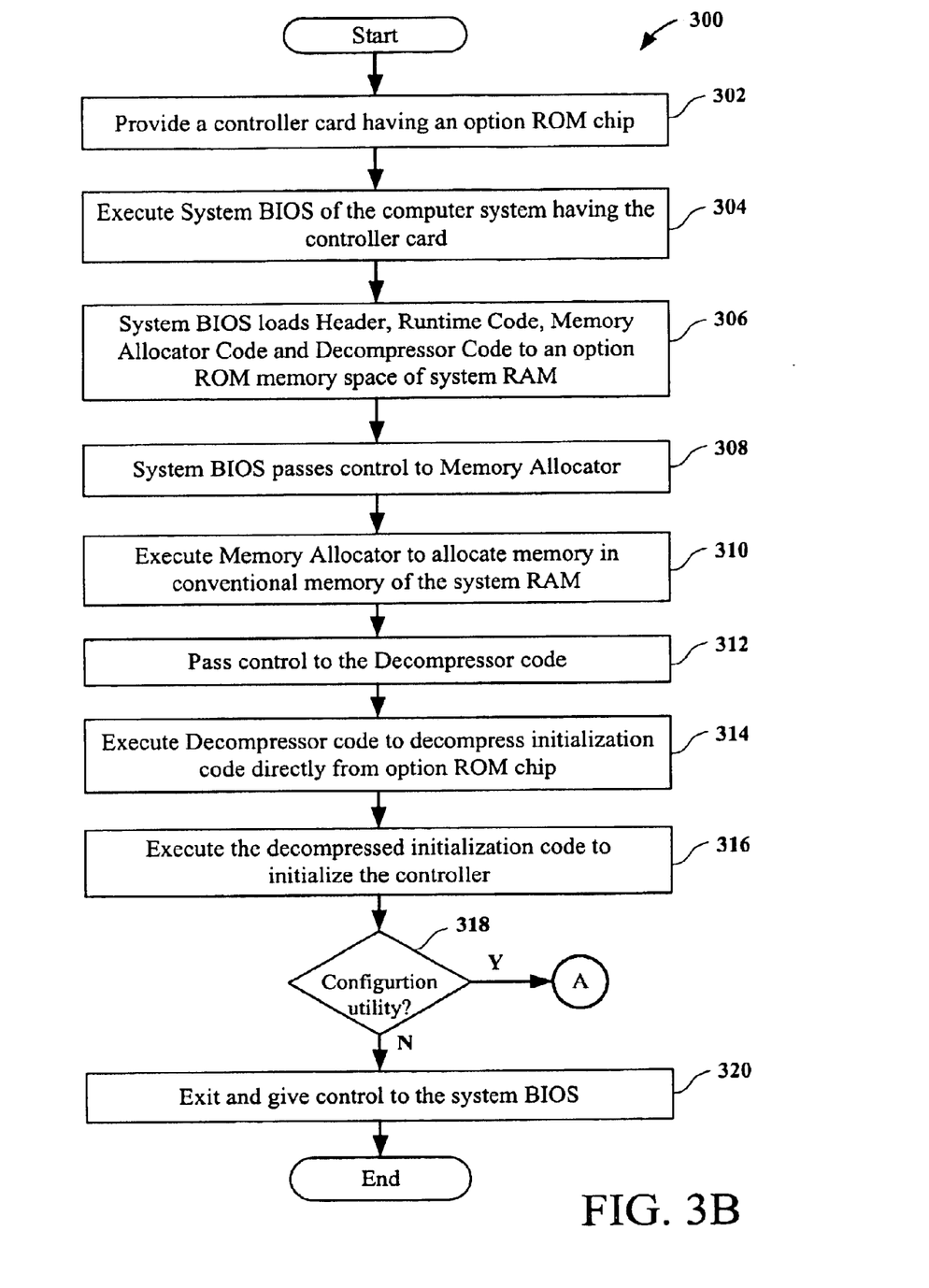
FIG. 3B illustrates a flowchart diagram that defines the method operations of the embodiment of FIG. 3A.

FIG. 3B illustrates a flowchart diagram 300 that defines the method operations of the embodiment of FIG. 3A. The method begins at an operation 302 where a controller card having an option ROM chip is provided. In operation 304, the system BIOS of the computer system having the controller card, controller chip, or host adapter card associated therewith is executed. The system BIOS will in operation 306 load the header, the runtime code, the memory allocator, and the decompressor code to the option ROM memory space of the system RAM. It should be noted that in this embodiment the decompresor code is loaded to the option ROM memory space, however, the amount of memory space occupied by the decompressor code is only around 4K in size. Of course, the size of the decompressor code can vary, depending on the controller application and other well known considerations.

The method now proceeds to operation 308 where the system BIOS passes control to the memory allocator and then the memory allocator is executed in operation 310. The execution of the memory allocator is configured to allocate conventional memory space for holding decompression parameters and a decompressed version of the initialization code. Now, the method moves to operation 312 where control is passed to the decompressor code and the decompressor code is executed in operation 314. The execution of the decompressor code is configured to decompress the initialization code directly from the option ROM chip and to the allocated conventional memory of the system RAM.

The decompressed initialization code is then executed in operation 316 in order to initialize the controller. As mentioned above, the controller can be in the form of a controller chip, a controller card, a host adapter card, and the like. The devices connected to the controller will therefore be accessible to the user of the computer system. If configuration utility operation is desired by the user, the user may interrupt the process which moves the method operation from 318 to A of FIG. 4. If no configuration utility operation is desired, the method will proceed to operation 320 where the initialization method will exit and control will return to the system BIOS. At this point, the computer system can move toward bootup if all other known house keeping initialization operations are complete.

Figure 4:
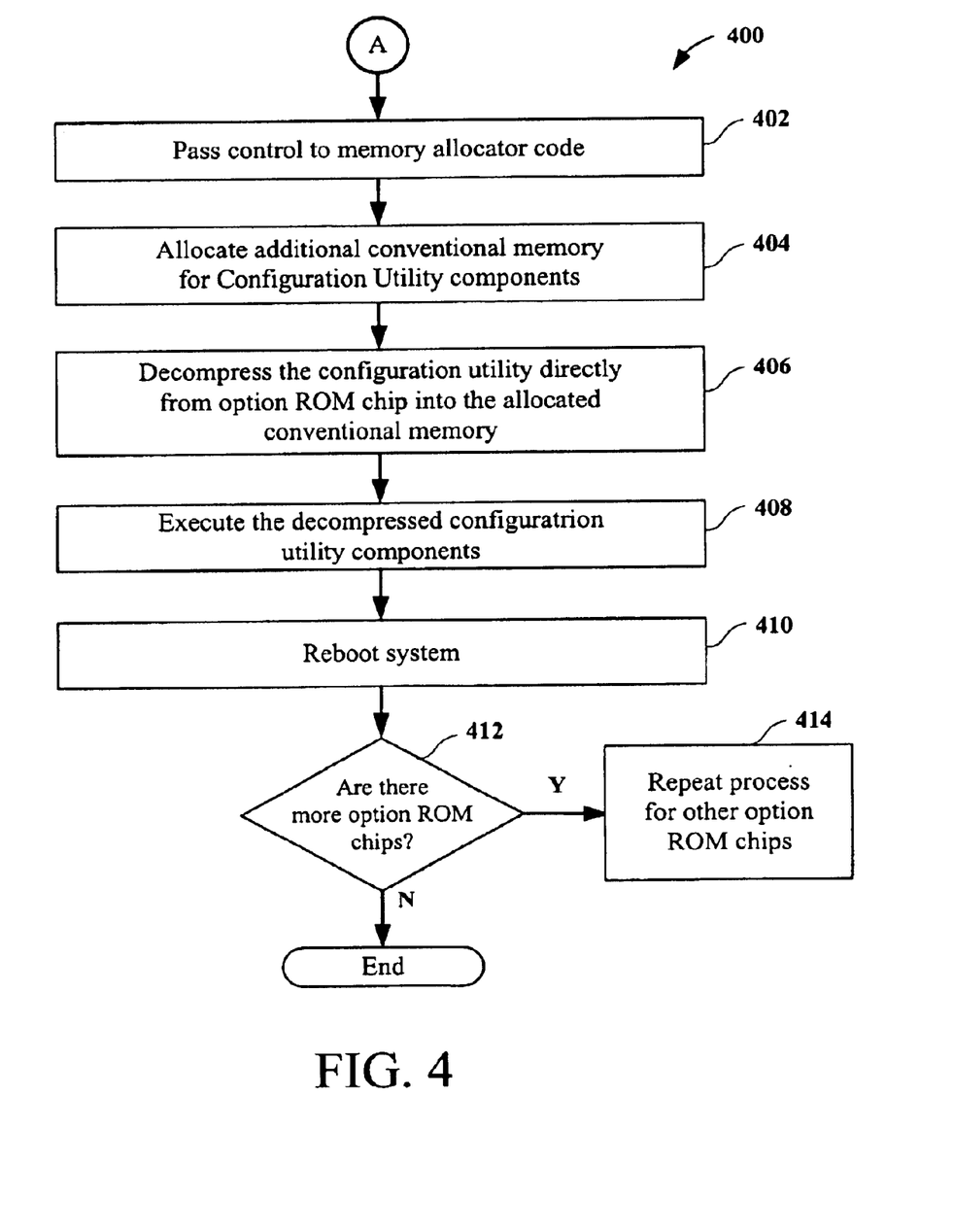
FIG. 4 illustrates a flowchart diagram that defines the method operations performed when a user desires to use the configuration utilities, in accordance with one embodiment of the present invention.

FIG. 4 illustrates a flowchart diagram 400 that defines the method operations performed when a user desires to use the configuration utilities, in accordance with one embodiment of the present invention. The method begins at an operation 402 where control is passed to the memory allocator code. Once control is passed, the method moves to operation 404 where additional conventional memory is allocated for configuration utility components. The decompressor will then decompress the configuration utility directly from the option ROM chip into the allocated conventional memory. As mentioned above, the configuration utility is therefore only decompressed into the conventional memory when the user wants to implement features of the configuration utility. In one example, the decompressed configuration utility may include 32K of SCSI configuration, and 32K of container configuration. Furthermore, it should also be noted that the configuration utility does not need to be loaded into the option ROM memory space at all, which is not the case in the prior art. This therefore provides a download on demand (DOD) functionality.

Once the configuration utility has been decompressed into the conventional memory, the decompressed configuration utility is executed in operation 408. When the user has performed the desired configurations, for either a SCSI controller or a RAID controller, the system is rebooted 410. In operation 412 it is determined whether there are any more option ROM chips associated with the system for which initialization and configuration is desired. If yes, the initialization and configuration is then repeated for each of the option ROM chips. If no, then the method will be done.

Figure 5:
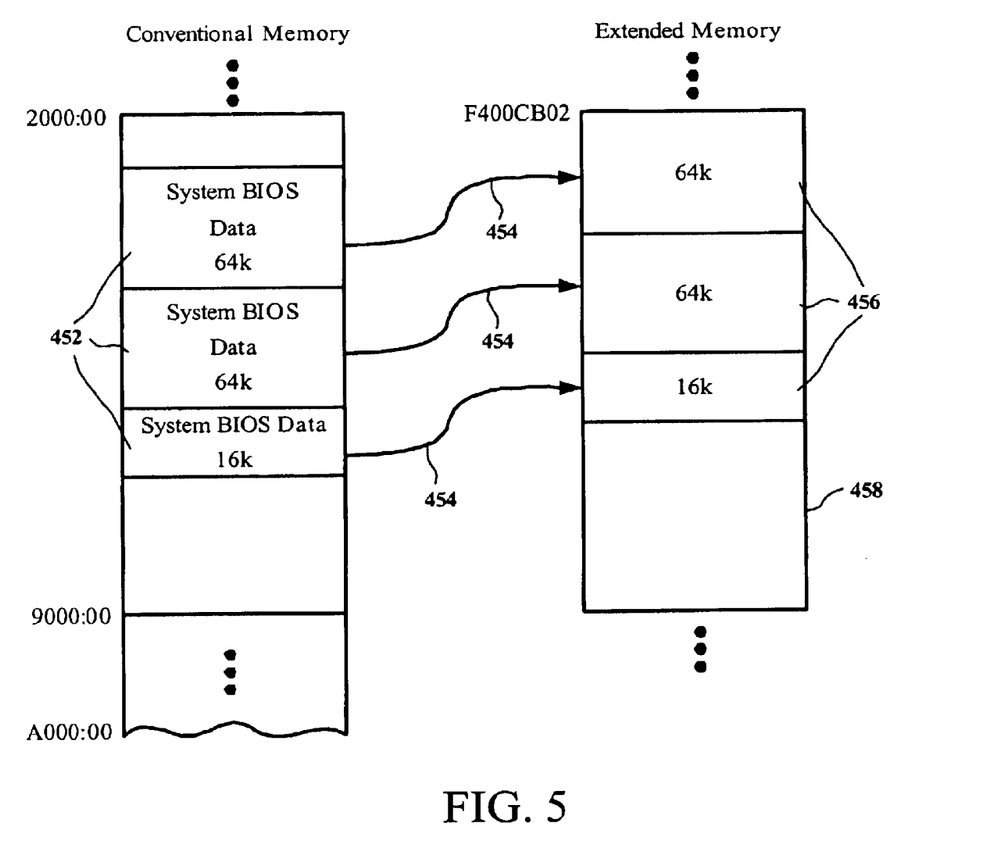
FIG. 5 shows a block diagram of a migration of a system BIOS data between a conventional memory and an extended memory in accordance with one embodiment of the present invention.

FIG. 5 shows a block diagram of a migration of a system BIOS data 452 between a conventional memory 450 and an extended memory 458 in accordance with one embodiment of the present invention. The conventional memory 450 may contain a system BIOS data 452 which can be located in any memory address and in one embodiment occupies memory addresses between about 2000:00 and about 9000:00. As is well known, the system BIOS data 452 can be any type of data and can have different size requirements depending on the application. Exemplary data may include data segments of about 64k (e.g., decompressor interim segment), about 64k (e.g., initialization code), and about 16k (e.g., decompressor parameters). For purposes of simplifying the embodiments of the present invention, the data segments will be referred to herein as system BIOS data 452. Additionally, the system BIOS data 452 may be located in any portion of the conventional memory.

In one embodiment, a migration process is disclosed. In the migration process, the system BIOS data 452 is preferably copied to the extended memory 458 by migrations 454. After the copying is completed, a migrated system BIOS data 456 is located in the extended memory 458 beginning from the memory address of about F400CB02, for example. It should be understood that the migrated system BIOS data 456 may be located in any extended memory 458 location which may accommodate the data size of the migrated system BIOS data 456.

As discussed in reference to FIG. 3A, during memory allocation procedures, a memory allocator 142 is configured to allocate enough memory space in a conventional memory 104 to receive data that is decompressed from the compressed data within the option ROM BIOS chip 120. It should be appreciated that the memory allocator 142 may be any type of memory manager such as, for example, a post memory manager, a memory finder that looks for unwritten segments of a memory, etc. In one embodiment, by the time the memory allocator 142 is looking for convention memory, the conventional memory 450 is already fall of data. Therefore, oftentimes, the memory allocator 142 cannot find the conventional memory space needed to receive decompressed data from the option ROM BIOS chip 120. In this case, the memory allocator 142 finds system BIOS data 452 which occupy segments of the conventional memory 450 that are at least the amount of memory needed so conventional memory 450 can receive decompressed data from the option ROM BIOS chip 120. The memory allocator 142 then finds an open memory space that is at least the size of the system BIOS data 452 within the extended memory 458. The memory allocator 142 then copies the system BIOS data 452 to the open memory space within the extended memory 458. This copying occurs through migrations 454. The migrations 454 depict a visual representation of the transfer of the system BIOS data 452 from the conventional memory 450 to the extended memory 458. After the migration process is complete, the conventional memory 450 will have the available memory space to accommodate the decompressed data of the option ROM BIOS chip 120. In this way, the memory allocator 142 intelligently utilizes memory space in the extended memory 458 so that the conventional memory 450 is available to contain more initialization data than was previously possible. Therefore, a computer system with the memory allocator 142 is able to more efficiently and effectively manage more host adapters (having Option ROMs associated therewith) and associated peripheral devices, such as hard drives, etc.

Figure 6:
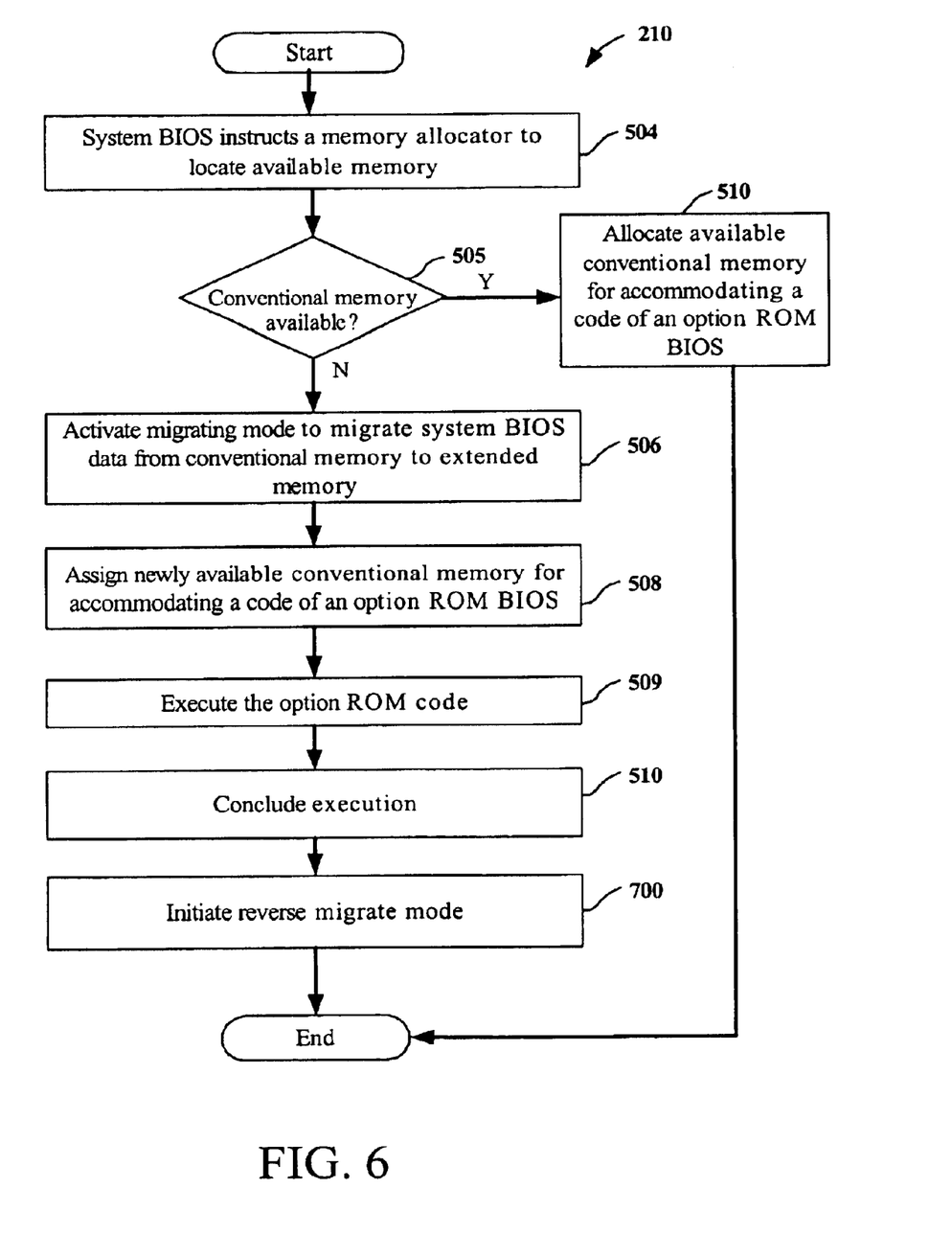
FIG. 6 shows a flowchart that defines the operations during allocation of memory resources in accordance with one embodiment of the present invention.

FIG. 6 shows a flowchart 210 that defines the operations during allocation of memory resources in accordance with one embodiment of the present invention. The method begins with operation 504 where the system BIOS instructs a memory allocator to locate available memory. In operation 504, the system BIOS requires a certain portion of a conventional memory 350 to decompress data stored in an option ROM BIOS chip 120. Therefore, the system BIOS utilizes the memory allocator to find available memory within a conventional memory 450. The method then proceeds to operation 505 which determines if conventional memory is available for use by the system BIOS. Operation 505 examines the conventional memory 450 to ascertain if the amount of memory required by the system BIOS is free within certain locations of the conventional memory. In one embodiment, the memory allocator 142 examines conventional memory addresses between about 2000:00 and about 9000:00 for available memory space. If the memory allocator 142 finds sufficient available memory then the methods proceeds to operation 510 which allocates available conventional memory for accommodating a decompressed version of the data from the option ROM BIOS chip 120. In operation 510, the method makes certain memory locations within the conventional memory available for use by the system BIOS. Therefore, if conventional memory is available, sufficient conventional memory is allocated and the method terminates at operation 510.

If operation 505 determines that the required conventional memory is not available then the methods proceeds to operation 506 which activates a migrating mode to migrate a system BIOS data 452 from the conventional memory 450 to the extended memory 458. In operation 506, the method migrates (i.e., transfers) the system BIOS data 452, occupying the amount of conventional memory required by the system BIOS, to the extended memory 458. Operation 506 is further explained in reference to FIG. 7. After operation 506, the method progresses to operation 508 which assigns newly available conventional memory for accommodating a code contained by an option ROM BIOS chip 120. In this operation, conventional memory that has been freed up by the migration process is then made available to the system BIOS. An compressed or uncompressed (may be either) data or code within the option ROM BIOS chip 120 is then inputted into the portion of the conventional memory 450 made available by operation 506. After operation 508, the method moves to operation 509 where the option ROM code is executed. Then operation 510 concludes the execution of the option ROM code.

After operation 510, the method advances to operation 700 where a reverse migration mode is initiated. In operation, 700, the decompressed (or regular code) may be deleted from the conventional memory and a previously copied system BIOS data is read from the extended memory and reallocated to the conventional memory. This operation is described in further detail in reference to FIG. 8. Therefore, through the use of an intelligent memory allocator method, memory not previously available to store system BIOS data may now be utilized to create additional memory space within a full conventional memory thus allowing for the better use of resources available to a computer system.

Figure 7:
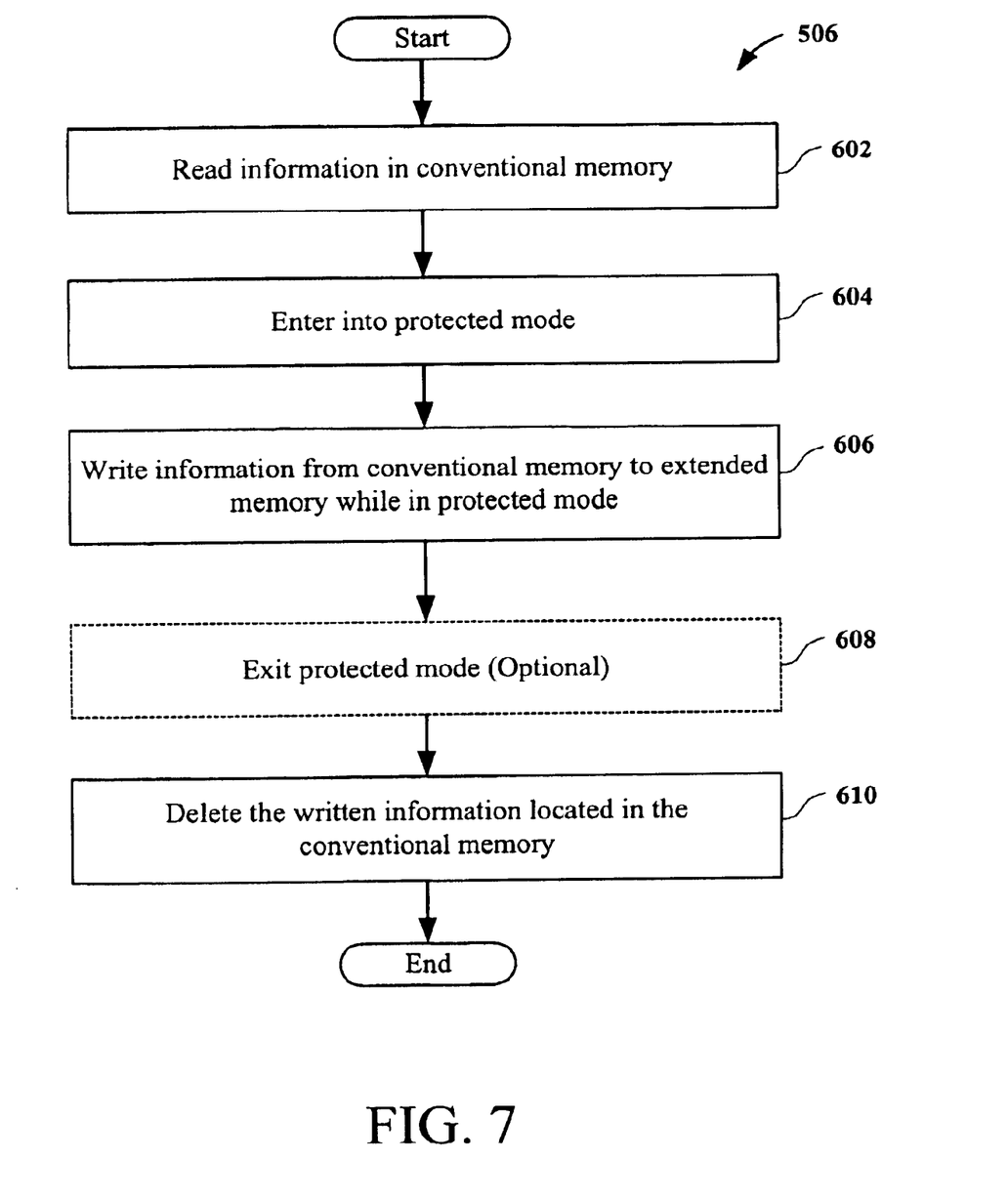
FIG. 7 illustrates a flow chart which shows a migration mode process in accordance with one embodiment of the present invention.

FIG. 7 illustrates a flow chart 506 which shows a migration mode process in accordance with one embodiment of the present invention. The method starts with operation 602 which reads a system BIOS data 452 in a conventional memory 450. In operation 602, after the memory allocator has located the system BIOS data 452 it has decided to migrate (move or transfer) from the conventional memory 450 to an extended memory 458, the memory allocator reads the system BIOS data 452 for migration to the extended memory 458. In one embodiment, the memory allocator moves three segments of system BIOS data which are about 64k, about 64k, and about 16k in size. It should be appreciated that the migration process within a migration mode may move any numbers or sizes of data segments.

After operation 602, the method progresses to operation 604 where the method enters into a protected mode. The conventional memory 450 typically operates in real mode and the extended memory 458 generally operates in protected mode. Therefore, to read and write the extended memory 458, operation 604 enters into protected mode. Real mode generally allows up to 1 megabyte of addressable memory by allowing segmentation while protected mode usually expands the physically addressable memory to over 1 megabyte. In addition, a program operating in real mode is generally limited to 640 kilobytes of a contiguous address range while the protected mode typically does not have such limitations.

The method then progresses to operation 606 where the system BIOS data 452 from the conventional memory 450 is written to the extended memory 458 while in protected mode. In operation 606, the system BIOS data 452 is migrated from the conventional memory 450 to the extended memory 458. In this way, information contained in the system BIOS data 452 is retained by the computer system when decompressed data from the option ROM BIOS chip 120 is written into the conventional memory space where the system BIOS data 452 was located before the migration process. The data migrated into the extended memory 458 is called migrated system BIOS data 456. After operation 606, the method optionally proceeds to operation 610 where the system BIOS data 452 located in the conventional memory 450 that has been written to the extended memory 458 is deleted. In operation 610, the system BIOS data 452 in the conventional memory 450 that was copied to the extended memory 458 is deleted so the only copy of the system BIOS data 452 remaining is the migrated system BIOS data 456 within the extended memory 458. Operation 610 clears out the memory space in the conventional memory 450 which is required by the system BIOS for locating the decompressed data from the option ROM BIOS chip 120. As can be seen, the migrating process offers a new and novel way to intelligently transfer data from conventional memory to extended memory so, in effect, additional conventional memory space may be used for the initialization process by the system BIOS.

Figure 8:
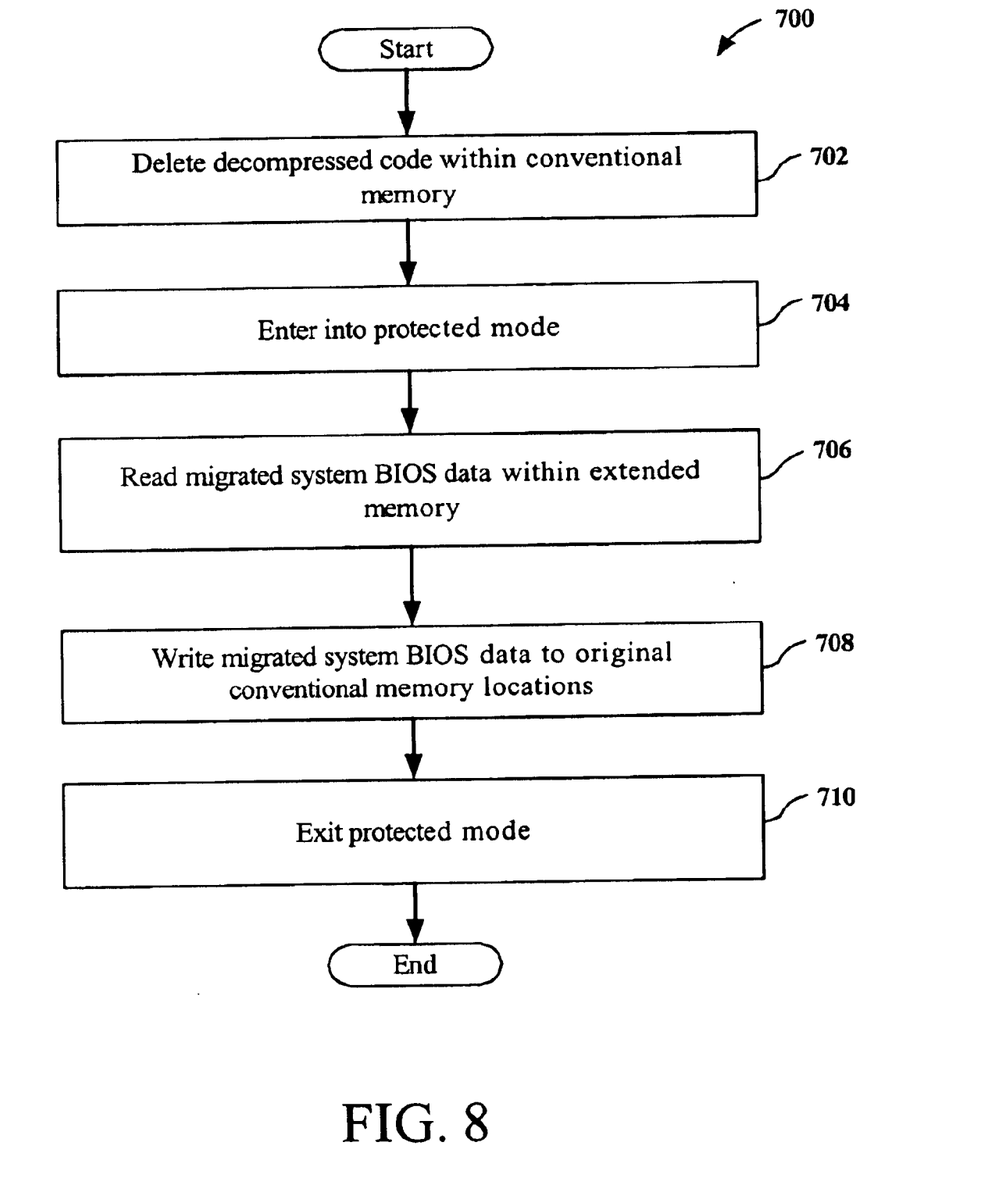
FIG. 8 shows a flow chart depicting a method where a migrated system BIOS data is returned from an extended memory to a conventional memory.

FIG. 8 shows a flow chart 700 depicting a method where a migrated system BIOS data 456 is returned from an extended memory 458 to a conventional memory 450. The method shown by flow chart 700 occurs after the system BIOS data 452 is copied from the conventional memory 450 to the extended memory 458 and after the decompressed data from the option ROM BIOS chip 120 has been placed within the conventional memory 450 and subsequently utilized to initialize or reconfigure a device controller.

The method begins with operation 702 which deletes decompressed code within the conventional memory 450. The decompressed code is the data that was decompressed from the compressed data located within the option ROM BIOS chip 120. As discussed in reference to FIG. 7, the decompressed code is placed in the conventional memory 450 after the system BIOS data 452 is migrated to the extended memory 458.

After operation 702, the method proceeds to operation 704 where a protected mode is entered. As stated in reference to FIG. 6, to access the extended memory, protected mode is entered because the extended memory 458 generally only operates in protected mode as opposed to the conventional memory 450 which typically operates in real mode. After operation 704, the method moves to operation 706 where the migrated system BIOS data 456 within the extended memory 458 is read. In this operation, the migrated system BIOS data 456 that was previously located in the conventional memory 450 before the migrations 454 is read from the extended memory for return to the conventional memory 450.

The method then proceeds to operation 708 where the migrated system BIOS data 456 is written to the original conventional memory locations. Operation 708 is utilized because as the system initialization process continues, the system BIOS will be looking for the information contained within the system BIOS data 452 which the system BIOS placed within certain memory locations. Therefore, the same information stored within system BIOS data 452 that was temporarily migrated (and became migrated system BIOS data 456) to the extended memory 458 is returned to the original location within the conventional memory 450 so the system BIOS will be able to access the data when needed. It should be appreciated that the operation where the decompressed code within the conventional memory 450 was deleted (operation 702) may be implemented at any time before the migrated system BIOS data 456 is actually returned to the conventional memory 450.

After operation 708, the method concludes with operation 710 where the protected mode is exited. After the accessing of the extended memory 458 has been finished, there is no more need for the method to utilize the protected mode so the method exits back into real mode so conventional memory can be used. In this way, conventional memory can be efficiently used to initialize additional controllers that it would not be able to otherwise because of the restriction of memory space. The methods described powerfully and easily moves old data within conventional memory to extended memory on a temporary basis so additional conventional memory is freed up for actuation in the initialization process. By use of this powerful and robust method, the system BIOS does not even realize that its data within the conventional memory has been moved to another location because the moved data is returned to their original location in a seamless manner. Consequently, the method creates additional "space" within the conventional memory which allows better and efficient use of the computer memory system.

It should be understood that the embodiments of the present invention provide methods that enable intelligent initialization of controllers, host adapter cards, and the like, which have associated option ROM BIOS images. The intelligent initialization enables only part of the BIOS image of an option ROM BIOS chip to be loaded into the option ROM memory space of system RAM, Then, code that was not loaded to the option ROM memory space may be decompressed directly from the chip to conventional memory.

The present invention may implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method for optimizing of memory resources during an initialization routine of a computer system which prepares the computer system for loading of an operating system, comprising:

receiving a request from a system BIOS to locate an amount of conventional memory where the amount of conventional memory accommodates at least a decompressed version of data located in an option ROM BIOS;

determining availability of the amount of conventional memory requested by the system BIOS;

if it is determined that the amount of conventional memory requested by the system BIOS is not available, the method includes, reading a system BIOS data located within the conventional memory where the system BIOS data occupies at least the amount of conventional memory requested by the system BIOS;

writing the system BIOS data from the conventional memory to an extended memory; and deleting the system BIOS data located in the conventional memory that has been written into the extended memory.

2. A method for optimizing of memory resources during an initialization routine of a computer system which prepares the computer system for loading of an operating system as recited in claim 1, further comprising:

deleting a decompressed code from the option ROM BIOS located in the conventional memory where the system BIOS data originally resided;

reading the system BIOS data in the extended memory after an initialization code has been executed to initialize a processing component;

writing the system BIOS data from the extended memory to the conventional memory address where the system BIOS data originally resided before the system BIOS data was migrated to the extended memory.

3. A method for optimizing of memory resources during an initialization routine of a computer system which prepares the computer system for loading of an operating system as recited in claim 1, wherein the data located in the option ROM BIOS to be decompressed includes at least an initialization code, decompressor interim segment, and decompressing parameters.

4. A method for optimizing of memory resources during an initialization routine of a computer system which prepares the computer system for loading of an operating system as recited in claim 1, wherein the system BIOS data is located between the memory addresses of about 2000:00 and about 9000:00 of the conventional memory.

5. A method for optimizing of memory resources during an initialization routine of a computer system which prepares the computer system for loading of an operating system as recited in claim 3, wherein the size of the initialization code is about 64k, the size of the decompressor interim segment is about 64k, and the size of the decompressing parameters is about 16k.

6. A method for optimizing of memory resources during an initialization routine of a computer system which prepares the computer system for loading of an operating system as recited in claim 1 wherein the writing the system BIOS data from the conventional memory to an extended memory is done in a protected mode.

7. A method for optimizing of memory resources during an initialization routine of a computer system which prepares the computer system for loading of an operating system as recited in claim 1, wherein the deleting the system BIOS data located in the conventional memory that has been written into the extended memory is done in real mode.

8. A method for optimizing of memory resources during an initialization routine of a computer system which prepares the computer system for loading of an operating system as recited in claim 2, wherein the reading the system BIOS data in the extended memory after an initialization code has been executed to initialize a processing component is done in protected mode.

9. A method for optimizing of memory resources during an initialization routine of a computer system which prepares the computer system for loading of an operating system as recited in claim 2, wherein the deleting a decompressed code from the option ROM BIOS located in the conventional memory where the system BIOS data originally resided is done in real mode.

10. A computer readable media having program instructions for optimizing of memory resources during an initialization routine of a computer system which prepares the computer system for loading of an operating system, the computer readable media comprising:

program instructions for receiving a request from a system BIOS to locate an amount of conventional memory where the amount of conventional memory accommodates at least a decompressed version of data located in an option ROM BIOS;

program instructions for determining availability of the amount of conventional memory requested by the system BIOS;

program instructions for reading a system BIOS data located within the conventional memory where the system BIOS data occupies at least the amount of conventional memory requested by the system BIOS if it is determined that the amount of conventional memory requested is not available;

program instructions for writing the system BIOS data from the conventional memory to an extended memory; and program instructions for deleting the system BIOS data located in the conventional memory that has been written into the extended memory.

11. A computer readable media having program instructions for optimizing of memory resources during an initialization routine of a computer system which prepares the computer system for loading of an operating system as recited in claim 10, the computer readable media further comprising:

program instructions for reading the system BIOS data in the extended memory after initialization code has been executed to initialize a processing component;

program instructions for deleting a decompressed code from the option ROM BIOS located in the conventional memory where the system BIOS data originally resided;

program instructions for writing the system BIOS data from the extended memory to the conventional memory address where the system BIOS data originally resided before the system BIOS data was migrated to the extended memory.

12. A computer readable media having program instructions for optimizing of memory resources during an initialization routine of a computer system which prepares the computer system for loading of an operating system as recited in claim 10, wherein the data located in the option ROM BIOS to be decompressed includes at least an initialization code, decompressor interim segment, and decompressing parameters.

13. A computer readable media having program instructions for optimizing of memory resources during an initialization routine of a computer system which prepares the computer system for loading of an operating system as recited in claim 10, wherein the system BIOS data located is between the memory addresses of about 2000:00 and about 9000:00 of the conventional memory.

14. A computer readable media having program instructions for optimizing of memory resources during an initialization routine of a computer system which prepares the computer system for loading of an operating system as recited in claim 12, wherein the size of the initialization code is about 64k, the size of the decompressor interim segment is about 64k, and the size of the decompressing parameters is about 16k.

15. A computer readable media having program instructions for optimizing of memory resources during an initialization routine of a computer system which prepares the computer system for loading of an operating system as recited in claim 10, wherein the writing the system BIOS data from the conventional memory to an extended memory is done in protected mode.

16. A computer readable media having program instructions for optimizing of memory resources during an initialization routine of a computer system which prepares the computer system for loading of an operating system as recited in claim 10, wherein the deleting the system BIOS data located in the conventional memory that has been written into the extended memory is done in real mode.

17. A computer readable media having program instructions for optimizing of memory resources during an initialization routine of a computer system which prepares the computer system for loading of an operating system as recited in claim 11, wherein the reading the system BIOS data in the extended memory after an initialization code has been executed to initialize a processing component is done in protected mode.

18. A computer readable media having program instructions for optimizing of memory resources during an initialization routine of a computer system which prepares the computer system for loading of an operating system as recited in claim 11, wherein the deleting a decompressed code from the option ROM BIOS located in the conventional memory where the system BIOS data originally resided is done in real mode.

19. A computer implemented method for optimizing of memory resources during an initialization routine of a computer system which prepares the computer system for loading of an operating system, comprising:

executing a request from a system BIOS to locate an amount of conventional memory where the amount of conventional memory accommodates at least a decompressed version of data located in an option ROM BIOS;

determining availability of the amount of conventional memory requested by the system BIOS;

migrating a system BIOS data located within the conventional memory to an extended memory if it is determined that the amount of conventional memory requested is not available;

deleting the system BIOS data remaining in the conventional memory; and returning a migrated system BIOS data in the extended memory to the conventional memory after an initialization code has been executed to initialize a processing component.

20. A computer implemented method for optimizing of memory resources during an initialization routine of a computer system which prepares the computer system for loading of an operating system as recited in claim 19, wherein the data located in the option ROM BIOS to be decompressed includes at least an initialization code, decompressor interim segment, and decompressing parameters.

21. A computer implemented method for optimizing of memory resources during an initialization routine of a computer system which prepares the computer system for loading of an operating system as recited in claim 19, wherein the system BIOS data is located between the memory addresses of about 2000:00 and about 9000:00 of the conventional memory.

22. A computer implemented method for optimizing of memory resources during an initialization routine of a computer system which prepares the computer system for loading of an operating system as recited in claim 20, wherein the size of the initialization code is about 64k, the size of the decompressor interim segment is about 64k, and the size of the decompressing parameters is about 16k.

23. A method for optimizing memory resources during an initialization routine of a computer system, comprising:

executing a request to locate an amount of conventional memory, where the amount of conventional memory accommodates at least a decompressed version of BIOS data;

determining availability for the requested amount of conventional memory, migrating a system BIOS data located within the conventional memory to an extended memory if it is determined that the amount of conventional memory requested is not available;

deleting the migrated system BIOS data from the conventional memory; and returning the migrated system BIOS data from the extended memory to the conventional memory after the BIOS data has been initialized in the conventional memory.

24. A method for optimizing memory resources during an initialization routine of a computer system as recited in claim 23, wherein the BIOS data is associated with an Option ROM BIOS.

25. A method for optimizing memory resources during an initialization routine of a computer system as recited in claim 23, wherein the BIOS data is initialized to run a processing component.

26. A method for optimizing memory resources during an initialization routine of a computer system as recited in claim 25, wherein the processing component is a host adapter.

27. A method for optimizing memory resources during an initialization routine of a computer system as recited in claim 26, wherein one or more peripheral devices are connected to the host adapter.

28. A method for optimizing memory resources during an initialization routine of a computer system as recited in claim 26, wherein the host adapter is one of a SCSI controller and a RAID controller.

* * * * *